United States Patent
Kalamatianos et al.

(10) Patent No.: US 10,884,940 B2
(45) Date of Patent: Jan. 5, 2021

(54) METHOD AND APPARATUS FOR USING COMPRESSION TO IMPROVE PERFORMANCE OF LOW VOLTAGE CACHES

(71) Applicant: Advanced Micro Devices, Inc., Santa Clara, CA (US)

(72) Inventors: John Kalamatianos, Boxborough, MA (US); Shrikanth Ganapathy, Santa Clara, CA (US); Shomit Das, Austin, TX (US); Matthew Tomei, Itasca, IL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 14 days.

(21) Appl. No.: 16/230,618

(22) Filed: Dec. 21, 2018

(65) Prior Publication Data

US 2020/0201777 A1    Jun. 25, 2020

(51) Int. Cl.
*G06F 12/0893*    (2016.01)
*G06F 11/07*    (2006.01)

(52) U.S. Cl.
CPC ........ *G06F 12/0893* (2013.01); *G06F 11/073* (2013.01); *G06F 11/0751* (2013.01); *G06F 11/0775* (2013.01); *G06F 2212/1032* (2013.01); *G06F 2212/1044* (2013.01); *G06F 2212/608* (2013.01)

(58) Field of Classification Search
CPC .............. G06F 12/0893; G06F 11/073; G06F 11/0751; G06F 11/0775; G06F 2212/1032; G06F 2212/1044; G06F 2212/608

See application file for complete search history.

(56) References Cited

U.S. PATENT DOCUMENTS

| 8,640,005 B2 * | 1/2014 | Wilkerson | .......... G06F 11/1064 714/763 |
| 2006/0161831 A1 * | 7/2006 | Mehalel | .................... G06F 1/32 714/758 |
| 2008/0302105 A1 * | 12/2008 | Oda | ........................ F23R 3/343 60/737 |
| 2010/0082905 A1 * | 4/2010 | Wilkerson | ............ G06F 1/3275 711/122 |

(Continued)

OTHER PUBLICATIONS

Ferreron, Alexandra et. al.; "Concertina: Squeezing in Cache Content to Operate at Near-Threshold Voltage;" Sep. 18, 2015; IEEE; available at: https://ieeexplore.ieee.org/document/7272076/references#references.*

(Continued)

*Primary Examiner* — Ryan Bertram
*Assistant Examiner* — Richard L Sutton
(74) *Attorney, Agent, or Firm* — Liang & Cheng, PC (57) ABSTRACT

A method of operating a cache in a computing device includes, in response to receiving a memory access request at the cache, determining compressibility of data specified by the request, selecting in the cache a destination portion for storing the data based on the compressibility of the data and a persistent fault history of the destination portion, and storing a compressed copy of the data in a non-faulted subportion of the destination portion, wherein the persistent fault history indicates that the non-faulted subportion excludes any persistent faults.

18 Claims, 6 Drawing Sheets

(56) References Cited

U.S. PATENT DOCUMENTS

| | | | |
|---|---|---|---|
| 2014/0006849 A1* | 1/2014 | Ramirez | G06F 11/2053 714/6.13 |
| 2016/0092361 A1* | 3/2016 | Grimsrud | G06F 12/0238 711/102 |
| 2016/0170878 A1* | 6/2016 | Trika | G06F 12/0871 711/118 |
| 2016/0321174 A1* | 11/2016 | Li | G06F 12/0866 |
| 2017/0123897 A1* | 5/2017 | Quach | G06F 11/1064 |

OTHER PUBLICATIONS

UCSD.edu; lecture power point, "Cache Design;" Feb. 13, 2015; available at: https://web.archive.org/web/20150213060945/https://cseweb.ucsd.edu/classes/fa14/cse240A-a/pdf/08/CSE240A-MBT-L15-Cache.ppt.pdf.*

Alameldeen, Alaa et al.; "Adaptive Cache Design to Enable Reliable Low-Voltage Operation;" Oct. 14, 2010; IEEE; available at https://ieeexplore.ieee.org/abstract/document/5601699.*

Abella, Jaume et. al.; "Low Vccmin fault-tolerant cache with highly predictable performance;" Jan. 8, 2010; IEEE, available at: https://ieeexplore.ieee.org/document/5375339.*

Baek, Seungcheol et. al.; "Size-Aware Cache Management for Compressed Cache Architectures," Sep. 26, 2014; IEEE, available at: https://ieeexplore.ieee.org/document/6911946.*

Mittal, Sparsh et. al.; "A Survey of Architectural Approaches for Data Compression in Cache and Main Memory Systems," May 20, 2015; IEEE, available at: https://ieeexplore.ieee.org/document/7110612.*

Hong, Jeongkyu et. al.; "Smart ECC Allocation Cache Utilizing Cache Data Space;" Jul. 28, 2016; available at: https://ieeexplore.ieee.org/document/7524731 (Year: 2016).*

Chen, Long et. al.; "Free ECC: An Efficient Error Protection for Compressed Last-Level Caches;" Nov. 7, 2013; available at: https://ieeexplore.ieee.org/document/6657054 (Year: 2013).*

Yoon, Doe et. al.; "Virtualized and Flexible ECC for Main Memory;" 2010; available at: http://users.ece.utexas.edu/~merez/vecc_asplos_2010.pdf (Year: 2010).*

Ansari, Amin et. al.; "Maximizing Spare Utilization by Virtually Reorganizing Faulty Cache Lines;" Oct. 14, 2010; available at: https://ieeexplore.ieee.org/document/5601696 (Year: 2010).*

* cited by examiner

METHOD AND APPARATUS FOR USING COMPRESSION TO IMPROVE PERFORMANCE OF LOW VOLTAGE CACHES

GOVERNMENT RIGHTS

This invention was made with Government support under PathForward Project with Lawrence Livermore National Security (Prime Contract No. DE-AC52-07NA27344, Subcontract No. B620717 awarded by DOE. The Government has certain rights in this invention.

CROSS-REFERENCE TO RELATED APPLICATIONS

This application is related to co-pending U.S. patent application Ser. No. 15/489,438 entitled "Bit Error Protection in Cache Memories", filed on Apr. 17, 2017, which is incorporated by reference in its entirety. This application is also related to co-pending U.S. patent application Ser. No. 16/123,489 entitled "Bit Error Protection in Cache Memories", filed on Sep. 6, 2018, which is incorporated by reference in its entirety.

BACKGROUND

Most modern computing devices provide at least one level of cache memory (or "cache") in addition to a main memory in the computing device. Generally, caches are smaller-capacity, faster-access memories that are used for storing a limited number of copies of data and instructions to be used for performing various operations (e.g., computational operations, etc.) nearer to the functional blocks in the computing device that perform the operations. Caches are typically implemented using higher-speed memory circuits, such as static random access memory (SRAM) integrated circuits and other types of memory circuits.

During operation, the memory circuits in a cache can consume a significant portion of the overall electrical power consumed by a computing device. Because power consumption is an important concern for computing devices, designers have proposed various techniques for reducing the power consumption of memory circuits in caches. For example, designers have suggested lowering supply voltages for memory circuits in caches in order to reduce the power consumed by the memory circuits. Unfortunately, lowering supply voltages causes memory circuits in caches to become more susceptible to bit errors. This is true because lower supply voltages are associated with reduced noise margins for the memory elements in the memory circuits. In other words, at lower supply voltages, the memory elements are more susceptible to faults arising from process variation and/or other effects. These "low-voltage faults" are persistent at a given supply voltage (or, more precisely, at a combination of supply voltage, frequency, and temperature), in that memory elements experiencing the low-voltage faults will continue to experience the same low-voltage faults as long as the supply voltage is used (again, as long as a particular combination of supply voltage, frequency, and temperature is used/occurs).

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

Low voltage operation of static random-access memory (SRAM) based caches provides significant energy savings, but causes persistent faults at a rate that grows exponentially with decreasing voltage. Low voltage faults are persistent and, unlike soft-errors, persist for the lifetime of the chip for a given low voltage and operating frequency. Furthermore, the number of persistent low voltage failures for a given low voltage increase with the operating frequency of the SRAM.

In one embodiment, a cache device operating at low voltage employs error protection mechanisms that allow the cache to operate with the same reliability levels as nominal voltage operation. Error protection is provided on-demand using a small cache called an error correction code (ECC) cache that stores error-recovery metadata. As the operating voltage decreases, the number of cache lines experiencing persistent low voltage faults increases exponentially, as does the number of faults per cache line. This creates two problems: 1) lines having greater than the maximum number of errors that can be corrected by the error recovery mechanism are disabled, and 2) the ECC cache is subjected to increased pressure (i.e., contention) as more cache lines are faulted and utilize the protection mechanism. More cache evictions are triggered due to the increased ECC cache pressure. As a result, there is an optimal minimum supply voltage $V_{min}$ below which the performance loss is non-trivial. One way to maintain reliable operation in an SRAM-based cache experiencing persistent low voltage bit errors is to sacrifice capacity. Errors are avoided by reducing capacity, either by disabling cache lines or by utilizing a subset of cache lines to store error protection metadata.

In one embodiment, the use of data compression allows the cache to be operated at a lower minimum supply voltage $V_{min}$, while avoiding the reduction in capacity that would otherwise accompany low (i.e., below nominal) voltage operation. The performance loss is minimized by allowing more faulted cache lines to remain enabled, and by storing data in these faulted lines in compressed form. Information about the persistent faults detected in each line is maintained so that the compressed data is stored in a portion of the cache line that is fault-free. A cache replacement policy is also implemented that maximizes the likelihood that faulty cache lines will be available for placing compressed data.

Figure 1:
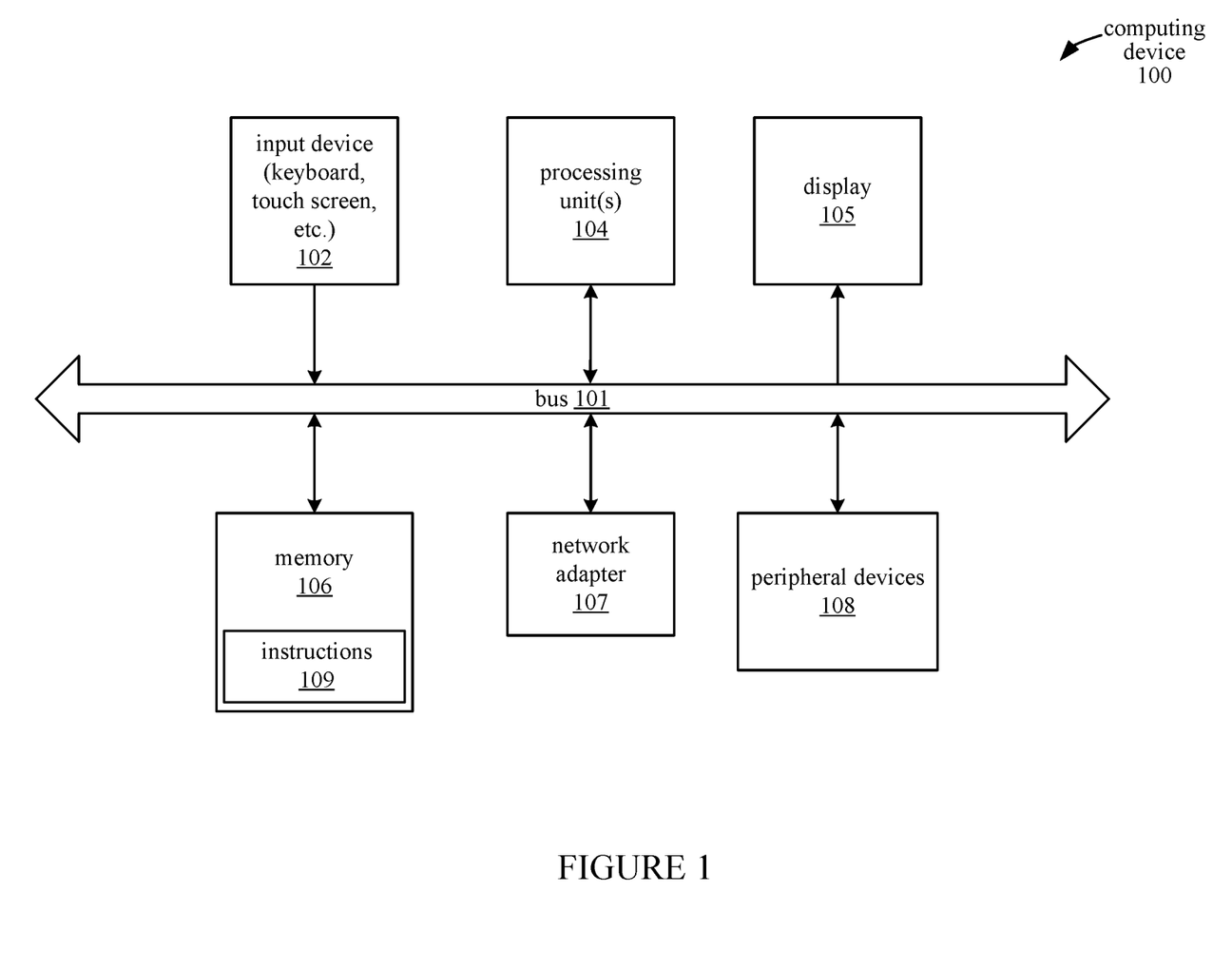
FIG. 1 illustrates a computing device, according to an embodiment.

FIG. 1 illustrates an embodiment of a computing device 100 in which the above data compression scheme is implemented. In general, the computing device 100 is embodied as any of a number of different types of devices, including but not limited to a laptop or desktop computer, mobile device, server, etc. The computing device 100 includes a number of components 102-108 that communicate with each other through a bus 101. In computing device 100, each of the components 102-108 is capable of communicating with any of the other components 102-108 either directly through the bus 101, or via one or more of the other components 102-108. The components 101-108 in computing device 100 are contained within a single physical enclosure, such as a laptop or desktop chassis, or a mobile phone casing. In alternative embodiments, some of the components of computing device 100 are embodied as peripheral devices such that the entire computing device 100 does not reside within a single physical enclosure.

The computing device 100 also includes user interface devices for receiving information from or providing information to a user. Specifically, the computing device 100 includes an input device 102, such as a keyboard, mouse, touch-screen, or other device for receiving information from the user. The computing device 100 displays information to the user via a display 105, such as a monitor, light-emitting diode (LED) display, liquid crystal display, or other output device.

Computing device 100 additionally includes a network adapter 107 for transmitting and receiving data over a wired or wireless network. Computing device 100 also includes one or more peripheral devices 108. The peripheral devices 108 may include mass storage devices, location detection devices, sensors, input devices, or other types of devices used by the computing device 100.

Computing device 100 includes one or more processing units 104, which in the case of multiple processing units 104 are capable of operating in parallel. The processing units 104 receive and execute instructions 109 that are stored in the memory subsystem 106. In one embodiment, each of the processing units 104 includes multiple computing nodes that reside on a common integrated circuit substrate. Memory subsystem 106 includes memory devices used by the computing device 100, such as random-access memory (RAM) modules, read-only memory (ROM) modules, hard disks, and other non-transitory computer-readable media.

Some embodiments of computing device 100 may include fewer or more components than the embodiment as illustrated in FIG. 1. For example, certain embodiments are implemented without any display 105 or input devices 102. Other embodiments have more than one of a particular component; for example, an embodiment of computing device 100 could have multiple buses 101, network adapters 107, memory devices 106, etc.

Figure 2:
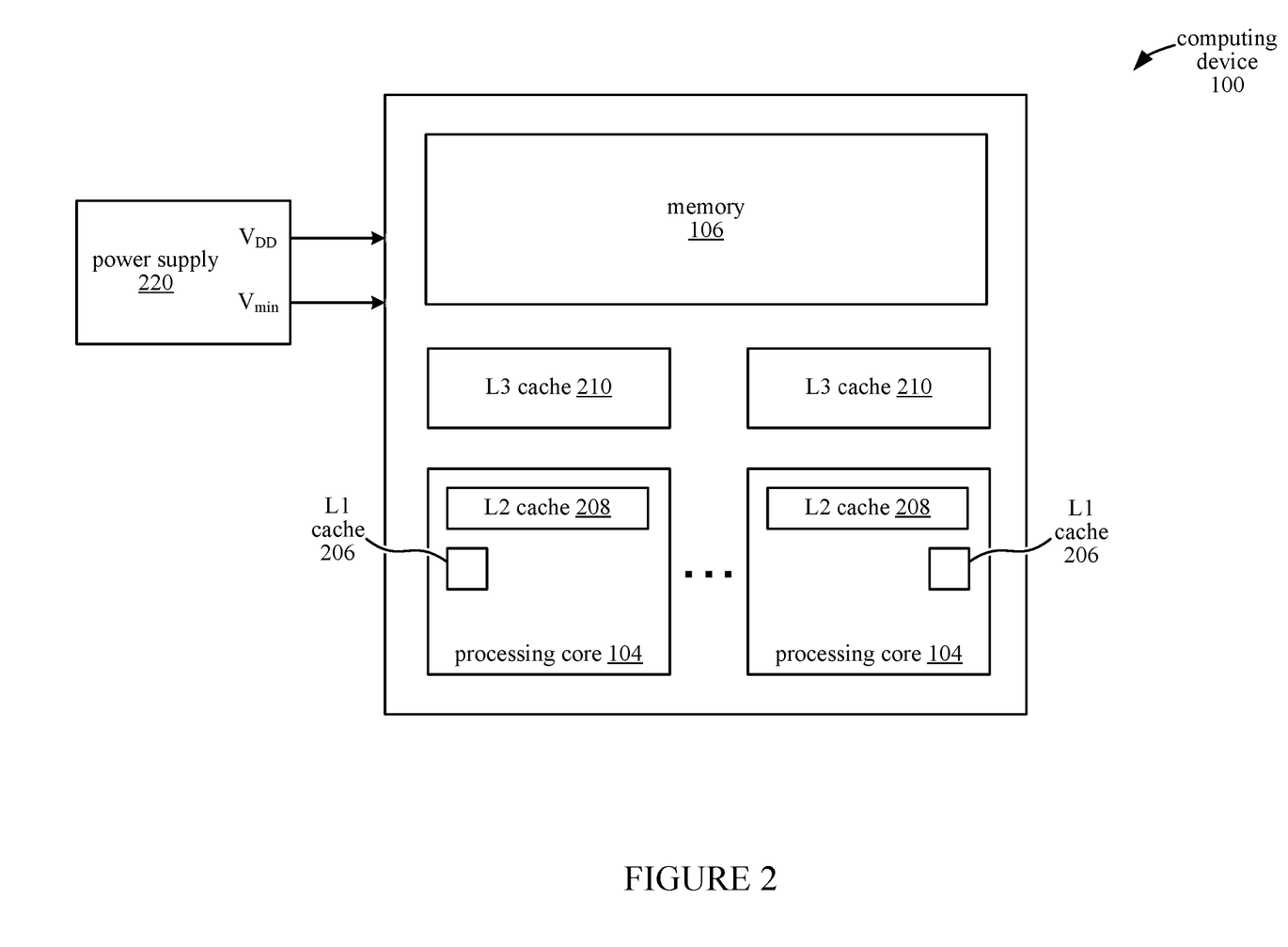
FIG. 2 illustrates components in a computing device, according to an embodiment.

FIG. 2 is a block diagram illustrating the processing cores and memory of the computing device 100, according to an embodiment. As illustrated in FIG. 2, the computing device 100 includes processing cores 104, memory 106, and a number of caches 206, 208, and 210.

Generally, the cores 104, memory 106, and caches 206-210 are implemented in hardware, i.e., using various circuit elements and devices. For example, the cores 104, memory 106, and caches 206-210 can be entirely fabricated on one or more semiconductor chips, including on one or more separate semiconductor chips, can be fashioned from semiconductor chips in combination with discrete circuit elements, can be fabricated from discrete circuit elements alone, etc. As described herein, some or all of cores 104, memory 106, and caches 206-210 perform operations associated with the placement of compressed data in faulted cache lines.

The processing cores 104 are functional blocks that perform computational and other operations (control, configuration, etc.) in the computing device 100. Each core 104 includes elements such as a central processing units (CPUs) or CPU cores, application specific integrated circuits (ASICs), general purpose graphics processing units (GPG-PUs), field-programmable gate arrays (FPGA), etc. for performing the operations.

Memory 106 is a functional block that performs operations of a memory in computing device 100 (e.g., a "main memory"). Memory 106 includes memory circuits such as one or more of dynamic random access memory (DRAM), double data rate synchronous DRAM (DDR SDRAM), non-volatile random access memory (NVRAM), and/or other types of memory circuits for storing data and instructions for use by functional blocks in computing device 100, as well as control circuits for handling accesses of the data and instructions that are stored in the memory circuits.

The caches 206-210 include a hierarchy of cache memory functional blocks, each of which is used for storing limited numbers of copies of data and instructions for access by other functional blocks in computing device 100. The hierarchy of caches includes an L1 cache 206, L2 cache 208, and L3 cache 210 for each core 104. Each of the L1 cache 206, L2 cache 208, and L3 cache 210 includes memory circuits such as static random access memory (SRAM) memory circuits that are used for storing the copies of data and instructions, as well as control circuits for handling accesses of the memory circuits. Proceeding in the order L1 cache 206, L2 cache 208, and L3 cache 210, in some embodiments, each cache is larger in capacity (i.e., includes more memory circuits) and is located farther from the functional blocks that use the copies of data and instructions stored therein and is slower to access. In other words, the L1 caches 206 are the smallest of the caches in capacity and are located most closely to their corresponding computational mechanisms, making the L1 caches 206 the fastest to access (i.e., having the lowest latency) among the cache levels in the hierarchy. In describing the caches in the hierarchy, the L1 caches 206 are described as the "highest" level in the hierarchy, with the L2 caches 208 and the L3 caches 210 in successively "lower" levels of the hierarchy.

Although embodiments are described having a particular arrangement of cores 104, some embodiments include a different number and/or arrangement of cores, as shown by the ellipsis between cores 104 in FIG. 2. For example, some embodiments have only one core, while other embodiments have five, eight, or another number of cores. Generally, the described embodiments can use any arrangement of cores that can perform the operations herein described. In addition, although embodiments are described with a particular arrangement of caches, some embodiments include a different number and/or arrangement of caches. For example, some or all of the caches (e.g., L1 cache 206, etc.) may be implemented as separate instruction and data caches. As another example, some embodiments include different levels of caches, from only one level of cache to multiple levels of caches, and some or all of these caches may be located in one of the cores 104 and/or external to one of the cores 104.

Generally, the described embodiments can use any arrangement of caches that can perform the operations herein described.

The computing device 100 also includes a power supply 220 capable of providing either of a nominal supply voltage $V_{DD}$ or a low supply voltage $V_{min}$ for powering components in the computing device 100, including the cache devices 206-210. The nominal supply voltage $V_{DD}$ is the operating voltage at which the memory is designed to operate; operating the cache devices 206-210 at their respective nominal supply voltages causes a minimal number or no low voltage faults. The low supply voltage $V_{min}$ is a lower voltage than the nominal voltage $V_{DD}$, and powering the cache devices 206-201 using the low supply voltage $V_{min}$ causes one or more persistent faults in the cache devices 206-210.

In one embodiment, the voltage supplied to the cache devices 206-210 is controlled by circuitry within the processing cores 104 or within one or more of the cache devices 206-210, which is capable of supplying either a nominal supply voltage or a low supply voltage to the cache devices (e.g., 206 and 208). For example, in some embodiments, the supply voltage for the memory circuits is capable of being lowered to reduce the amount of electrical power consumed by the memory circuits in the cache. In some of these embodiments, it is possible to lower the supply voltage to a voltage that is low enough to cause persistent low-voltage faults (i.e., to cause the memory circuits to output unexpected or undesired values due to the reduced noise margin caused by the lowered supply voltage). Such low-voltage faults persist for the life of the device for a given combination of supply voltage, frequency, and temperature.

As illustrated in FIG. 2, computing device 100 is simplified for clarity. In some embodiments, however, computing device 100 includes additional or different elements and mechanisms for performing the operations herein described and other operations. For example, computing device 100 can include additional power subsystems, media processing subsystems, input-output subsystems, communication subsystems, networking subsystems, display subsystems, etc.

Figure 3:
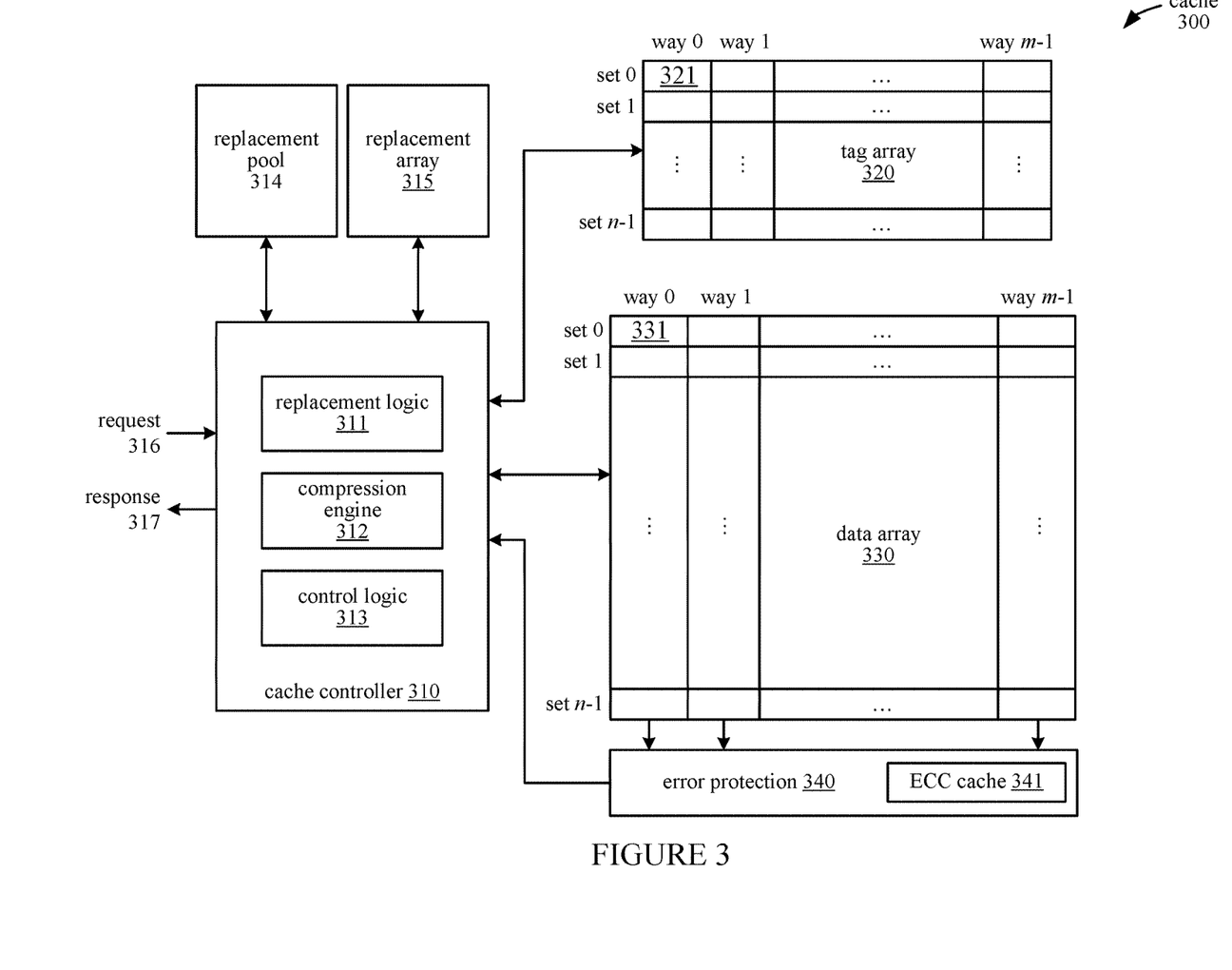
FIG. 3 illustrates an embodiment of a cache.

FIG. 3 presents a block diagram illustrating a cache 300, according to an embodiment. In some embodiments, some or all of the L1 cache 206, L2 cache 208, and L3 cache 210 in the same hierarchy or different hierarchies are implemented similarly to cache 300, and include at least the functional blocks shown in FIG. 3. The cache memory 300 includes data array 330, tag array 320, error protection module 340, and cache controller 310.

Data array 330 is a functional block that includes memory circuits (e.g., SRAM or another type of memory circuit) that are used for storing copies of data in cache 300. The data array 330 is organized as an n×m set associative cache, having n sets (indexed from 0 to n−1), with each set containing m ways (indexed from 0 to m−1) each containing a portion of the cache (e.g., a cache line 331) in which data is stored. The term data as used in the context of the data array 330 includes instructions as well as data to be referenced when executing instructions.

The tag array 320 is a functional block including memory circuits that are logically divided into n sets, with m ways in each set. Each entry in the tag array 320 is used to store address (or "tag") information that uniquely identifies data stored in a corresponding portion of the data array 330 so that each entry in tag array 320 is associated with a different portion (e.g., cache line 331) of data array 330. Each tag entry in the tag array 320 also includes a persistent fault history record, along with information indicating whether error protection module 340 stores error protection data for a given portion.

Cache controller 310 is a functional block that performs various functions for controlling operations in cache 300. For example, cache controller 310 includes control logic 313 that manages storing data to, invalidating data in, and evicting data from data array 330; performs lookups for data in tag array 320; handles coherency operations for cache 300; and/or responds to requests for data from cache 300. In some embodiments, cache controller 310 performs at least some of the operations for selecting an error protection for or disabling portions (e.g., cacheline 331) in data array 330 based on bit errors and the coherency states of stored data.

To perform a memory access operation in the cache 300, a memory access request 316 is provided to an input of the cache controller 310 (e.g., from one of the processing cores 104, or from a higher level of cache memory in the computing device 100). The memory access request 316 specifies the address of the data in main memory, which is used to lookup the tag in the tag array 320 and, if the tag is found (i.e., a cache hit), access the corresponding data in the data array 330. For a read request that results in a cache hit, the cache line at the corresponding location in the data array 330 is returned as a response 317 for the request. For a write request that results in a cache hit, the cache line at the corresponding location in the data array 330 is modified.

Accordingly, when data from a block of the main memory 106 is copied to the cache 300, the set in which the data will be stored is determined by index bits derived from the address of the data block in main memory 106. The data is then placed in the one of the cache lines (e.g., 331) corresponding to one of the n ways in the identified set. A tag for the data is derived from the memory address and is stored in the tag array, in a tag field (e.g., 321) corresponding with the set and way where the data is stored in the data array 330.

When a lookup of the data is subsequently performed in the cache, the set is again determined according to the index bits derived from the address of the memory block, then the tag bits (also derived from the memory address) are compared to the tags for the set in the tag array 320. A cache hit occurs when the tag is found, and the corresponding data is returned from the data array 330 in response 317. Although cache 300 as shown in FIG. 3 is simplified for illustrative purposes, in some embodiments, cache 300 includes a different arrangement of functional blocks. Generally, cache 300 includes sufficient functional blocks to perform the operations herein described and other operations performed by caches.

The control logic 313 also performs online training to generate a persistent fault history for each portion (e.g., cache line) of the data array 330. The persistent fault history record for each physical cache line is updated in response to detecting one or more persistent faults in the cache line. The persistent faults are detected when the cache line is used (e.g., at the first use of the cache line, or when data is evicted from the cache line). The control logic 313 records the number of persistent faults in each cache line and the location of the faults within the cache line. In one embodiment, the persistent fault history record of a cache line indicates whether a fault is located in the first half or the second half of the cache line.

To avoid using erroneous data caused by persistent low-voltage faults, the described embodiments use the fault history record to determine an error protection method to be used for portions of the cache, and to disable portions of the cache with more than a specified number (e.g., two) of faults. The mechanisms and operations herein described are not limited to protecting against low-voltage faults. Other faults that affect accesses to memory elements in a cache data array, such as failed circuit elements, process faults, thermal faults, etc. (i.e., conditions that cause the memory elements to experience persistent or repeated faults) are avoided using the mechanisms and operations herein described. These faults are referred to broadly as bit errors.

The error protection module 340 is coupled to the cache data array 330 for detecting and/or correcting errors in cache lines read from the data array 330. For example, the error protection module 340 performs parity-based error detection of single-bit errors, using parity bits stored in the cache lines of data array 330. In one embodiment, multiple parity bits are used for each cache line, with one bit for each of multiple subportions of the cache line, so that the subportions containing errors can be identified.

In other examples, the error protection module uses error-correction coding (ECC) to detect and correct errors in the cache lines. Examples of ECC include, but are not limited to, SECDED (single error correction, double error detection) coding, which corrects single-bit errors and detects double-bit errors, and DECTED (double error correction, triple error detection), which corrects up to double-bit errors and detects triple-bit errors.

In the described embodiments, check-bits for the above-described error correction codes are stored in an error correction code (ECC) cache 341. In some embodiments, the error correction code cache 341 includes a number of entries for storing error correction codes that is smaller than the number of portions of the cache memory. For example, the error code cache may include a number of entries that is 20% the number of portions in the cache. The control logic 313 maps the entries in the error correction code cache to cache lines in which single-bit persistent faults have been detected. In other words, each entry in the error correction code cache is not fixedly associated with a particular cache line or other portion of the data array 330. By configurably mapping the entries in this way, the described embodiments provide the safeguard of error correction for a subset including the more error-prone portions of the cache, without requiring the overhead associated with storing error correction codes for all of the portions of the cache.

In addition, the configurable mapping of the entries in error correction cache 341 is dynamically updated as cache 300 operates. For example, when a single-bit error is detected in a cache line, an entry in the ECC cache 341 is assigned or allocated to hold specified error protection information for the portion. When the error protection information is no longer needed for the portion (e.g., the single-bit error is no longer present or is avoided using data compression), the entry in error protection cache 208 is de-assigned, invalidated, etc. The entry is then reallocated for storing error protection information for another cache line in data array 330 in which one or more faults has been detected.

The cache controller 310 includes a compression engine 312. When a read request is received for retrieving compressed data that is in the cache (resulting in a cache hit), the compression engine 312 decompresses the compressed data that is read from the data array 330. When a request 316 causes new data to be written to the cache 300 (e.g., a write request or read request that causes a cache miss), the compression engine 312 determines whether the incoming data specified in the request is compressible. The compression engine determines the compressibility of the incoming data by calculating or estimating a size of the compressed copy of the data, a maximum compression ratio for the data, space savings that would be achieved by compressing the data, or another compressibility metric or combination of metrics. In one embodiment, the compression engine 312 determines that the data is compressible when the calculated compressibility metric exceeds a predetermined threshold. If the data is compressible, the compression engine 312 generates a compressed copy of the data for storing in the data array 330.

For example, a compression ratio of 4:1 (75% space savings) calculated for the incoming data exceeds a threshold compression ratio of 2:1 (50% space savings); therefore, the incoming data is determined to be compressible and is compressed prior to being stored in the data array 330. In this case, the data is sufficiently compressible that it can be stored in half (e.g., a non-faulted half) of the cache line. Continuing the example, data having a compression ratio of 4:3 (25% space savings) cannot be stored within half of the cache line and is not compressed.

The replacement logic 311 implements a replacement policy for selecting cache lines in respective sets to be dropped or evicted to free space for new data being written to the cache (e.g., in response to a cache miss). The cache line to be evicted, which is referred to as the victim cache line, is selected based on a replacement policy. Examples of replacement policies include, but are not limited to, least-recently-used (LRU) and least-frequently used (LFU). Information about which cache lines are the LRU, LFU, etc. cache lines and are thus candidates for eviction is stored in the replacement array 315, which is accessed by the replacement logic 311 when selecting cache lines for eviction. The control logic 313 evicts the data from the selected cache line. Data from evicted cache lines is written back to a lower level of memory, while dropped cache lines are overwritten with the incoming new data.

The physical way that is vacated by the eviction of the victim cache line is added to a pool of candidate ways that is available for storing incoming data being retrieved from lower levels of cache or the main memory in response to a cache miss. The vacated physical way is not specifically reserved for storing data returned for the same request causing the miss and eviction, but can be allocated for storing data returned for other requests. In one embodiment, a replacement pool data structure 314 indicates the vacated physical ways that have been added to pool.

According to this policy, the selection of a victim is independent from the selection of the physical way where the missing data will be placed in a cache. This 'lazy allocate-on-fill' policy, in which selection of the destination way for the incoming missing data is deferred until fill time, increases the probability that the cache controller is able to place compressible data in a physical way that has one persistent fault to maximize cache utilization. At a given point in time, the pool contains multiple candidates from which the control logic 313 selects a physical way for optimally storing compressible or non-compressible data.

The control logic 313 prioritizes the placement of compressible data in a physical way in which persistent faults are confined to a known subportion of the way, since non-compressible data would exceed the capacity of the non-faulted subportions of these ways. Accordingly, the control logic 313 also prioritizes placement of non-compressible data in non-faulted ways. Whether a particular way in the replacement pool 314 is faulted or non-faulted is indicated by the persistent fault history record for the way. For non-faulted ways, the persistent fault history indicates an absence of persistent faults in the way. For faulted ways, the persistent fault history indicates the presence of one or more persistent faults and identifies the one or more subportions in which the faults occur.

The replacement logic 311 matches compressible incoming data with a suitable destination way by identifying a faulted way in the replacement pool 314 that has persistent faults located outside a sufficiently large subportion of the way, as indicated by the persistent fault history. In one embodiment, the replacement logic 311 determines that the way has a non-faulted subportion having sufficient capacity to store a compressed copy of the data by comparing the non-faulted subportion with the calculated or estimated size of the compressed copy of the data.

When a suitable destination way is identified for storing the compressible incoming data, the data is compressed by the compression engine 312 and stored in the non-faulted subportion of the destination way. If the faulted way in which the compressed data is stored had previously been protected by error protection data allocated from the ECC cache 341, the control logic 313 reallocates the error protection data for protecting other data in a different portion of the cache having persistent faults. Since the compressed data is placed in the fault-free subportion of the destination way, the stronger error protection is not needed. The use of error protection data is thus minimized and utilization of the ECC cache 341 is maximized. This reduces the number of physical ways having persistent faults that remain unused because of insufficient ECC cache 341 capacity. The number of cache misses is decreased as a result.

In one embodiment, compressible data is not compressed when only non-faulted ways are available in the replacement pool 314. Alternatively, the data is compressed in the compression engine 312 and placed in a non-faulted way to reduce exposure of the data to soft errors (e.g., cosmic ray faults). When a non-faulted way is not available in the pool 314, the control logic places non-compressible data in a faulted way and allocates error protection data to protect the data from the known persistent faults.

In one embodiment, the data compression scheme is used in a cache that employs an allocate-on-miss replacement policy. When a cache miss occurs, data is evicted from the victim cache line, and the vacated physical way is reserved for the missing data. When the missing data is returned, if the data is compressible and the vacated way has a persistent fault, then the data is compressed and stored in a fault-free subportion of the vacated physical way. Any error protection data previously assigned for protecting data in the physical way is made available for protecting data in a different faulted physical way.

Figure 4A:
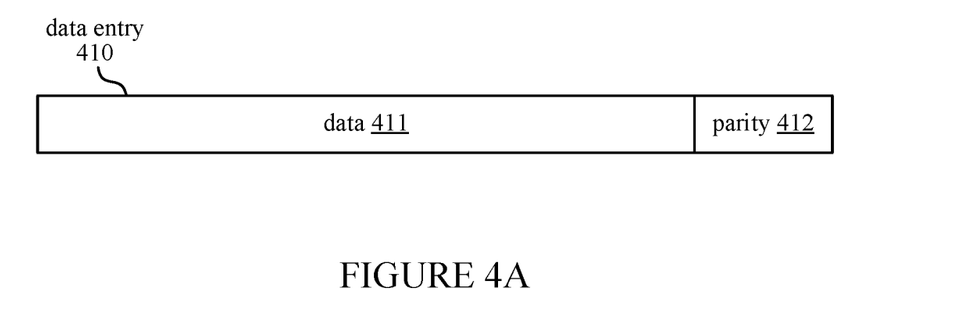
FIGS. 4A-4C illustrate entries in a data array, tag array, and error protection cache, according to an embodiment.

FIG. 4A presents a block diagram illustrating an entry 410 in the data array 330, according to an embodiment. As illustrated in FIG. 4A, data entry 410 includes data 411, which is used for storing the data of a cache line (i.e., for storing a plurality of bits of the cache line in memory circuits of a physical way). Entry 410 includes a set of parity bits 412 for performing parity checks on the data 411. The parity bits 412 (e.g., four bits for a 64-byte cache line) are used to detect bit errors in the data stored in data 300. In one embodiment, segmented and interleaved parity is used, in which data 411 is logically divided into a number of overlapping segments (e.g., four) and a parity bit is generated for each of the segments. The resulting parity bits 412 are stored in the data entry 410 and subsequently used during parity checks for detecting bit errors. By generating a separate parity bit for each segment, the locations of persistent faults can be determined and recorded in the persistent fault history record for the physical way. The locations of the persistent faults are then used to identify fault-free subportions of the entry 410 in which compressed data can be stored.

Figure 4B:
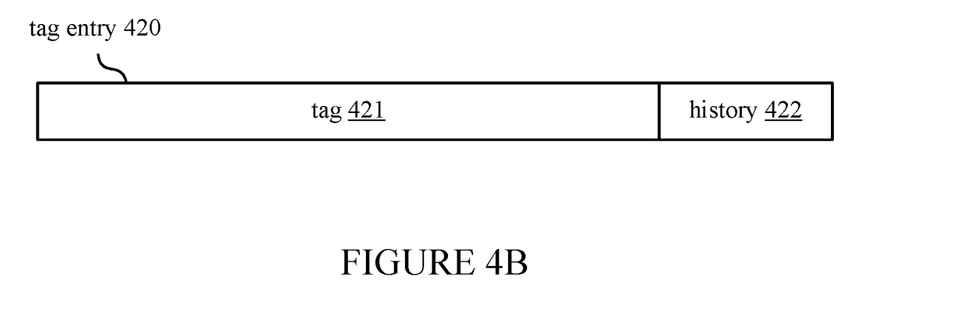

FIG. 4B presents a block diagram illustrating a tag entry 420 in tag array 320 according to an embodiment. As illustrated in FIG. 4B, entry 420 includes a tag 421 and a persistent fault history record 422. Tag 421 stores address information based on or derived from a memory address of data stored in a corresponding entry 410 in data array 330. The persistent fault history record 422 stores a representation of a number of bit errors detected in the corresponding physical way (i.e., in the bits of data 411).

In one embodiment, the fault history record 422 is a three-bit value, in which a value of '000' indicates a non-faulted cache line storing uncompressed data, '001' indicates a non-faulted cache line storing compressed data, '010' identifies a cache line with an unknown fault population (i.e., the cache line is untrained), '011' identifies a cache line having a single fault that stores uncompressed data, '100' identifies a cache line having a single fault that stores compressed data in a non-faulted first half of the cache line, '101' identifies a cache lines having a single fault that stores compressed data in a non-faulted second half of the cache line, and '111' identifies disabled cache lines having two or more faults. The '110' state remains unused. As described herein, history record 422 is used to determine a level of error protection to be used for the corresponding data 411, to determine whether the corresponding physical way is to be disabled, and to identify a non-faulted portion available for storing compressed data.

In an alternative embodiment, the compression state and fault history are encoded in separate bits, since compression can be applied to a cache line regardless of the number of faults in the cache line. The first of the three bits indicates whether the cache line is compressed, and is set to '0' when the cache line is compressed and '1' when the cache line is not compressed. The second and third bits indicate locations of faults in the cache line, and are set to '00' when no faults are present, '01' when one fault is located in the first half of the cache line, '10' when one fault is located in the second half of the cache line, and '11' when the cache line has more than one fault or the cache line is untrained. Since the compression status is not relevant when the cache line is untrained (i.e., the cache line has not been used) and when the cache line has two or more faults (i.e., the cache line is disabled), the compression bit is overloaded to distinguish between these two cases. Thus, when the second and third bits are '11', the compression bit is set to '0' to indicate that the cache line has more than one fault and '1' to indicate that the cache line is untrained.

Figure 4C:
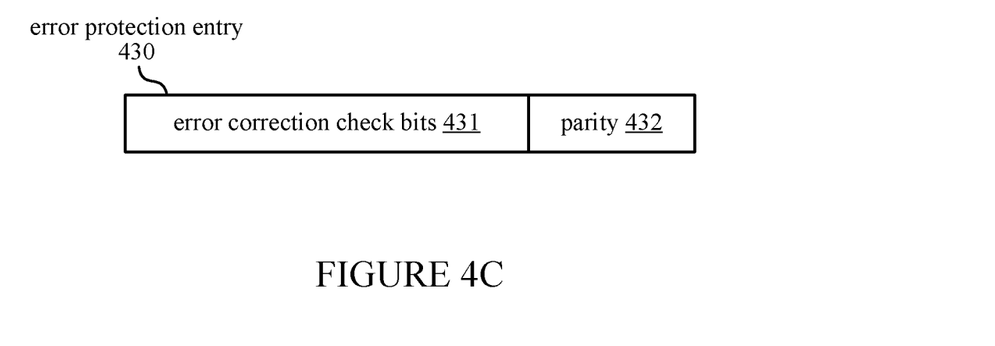

FIG. 4C presents a block diagram illustrating an entry 430 in the ECC cache 341, according to an embodiment. As illustrated in FIG. 4C, the error protection entry 430 includes check bits 431 of an error correction code and parity bits 432. Generally, the error correction check bits 431 are used to detect and/or correct bit errors in the data 411 to which the error protection entry 430 is allocated. For example, in some embodiments, the error correction check bits 431 are single-error correcting, double-error detecting or SECDED codes such as a Hamming code. Using a SECDED code, single-bit bit errors can be corrected and up to two-bit errors can be detected in corresponding data. The parity information 432 includes a number of bits that are used for performing parity checks such as the above-described segmented and interleaved parity checks.

Figure 5:
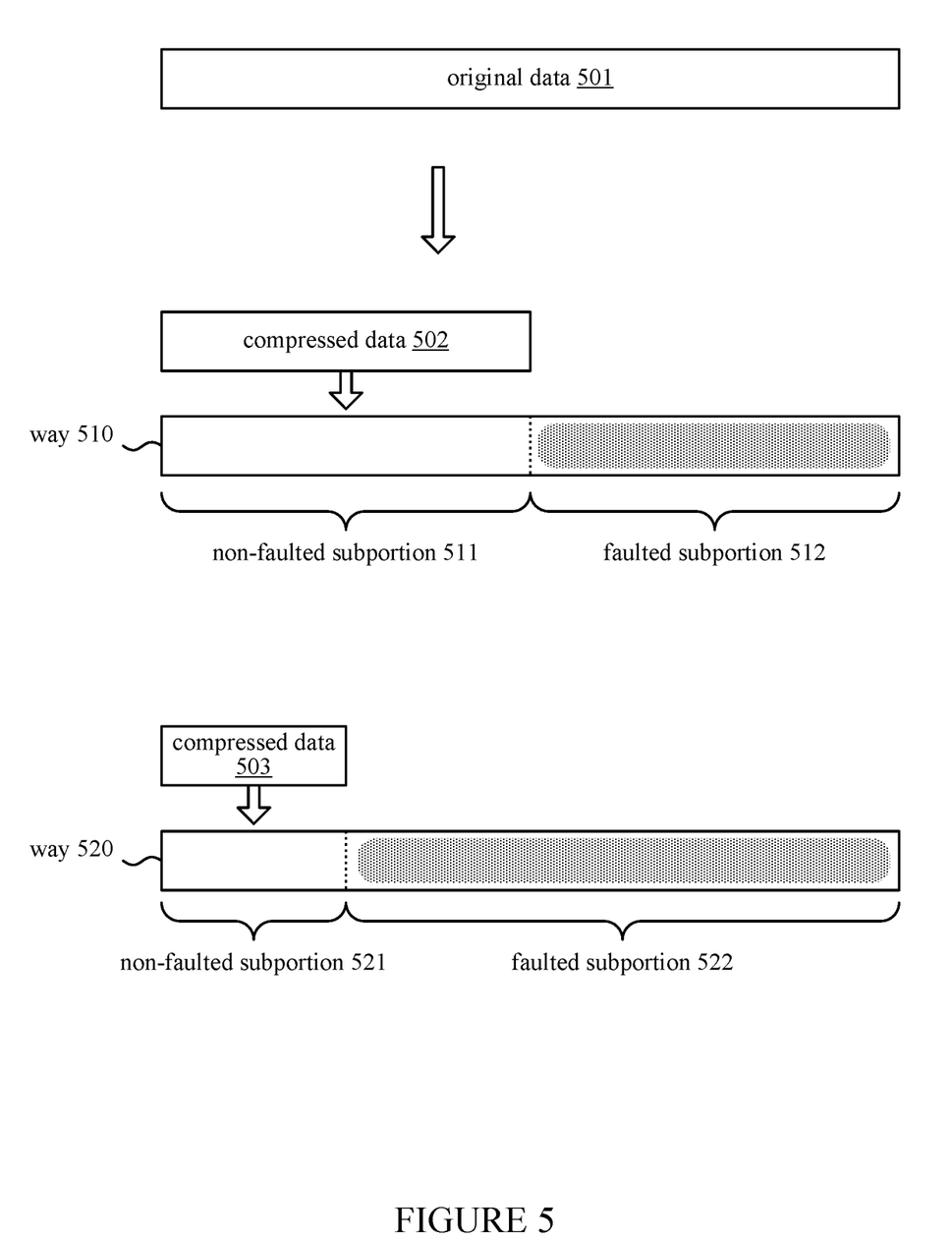
FIG. 5 illustrates the placement of compressed data in a non-faulted subportion of a physical way, according to an embodiment.

FIG. 5 illustrates the placement of compressed data into a non-faulted region of a physical way having persistent faults, according to an embodiment. The original data 501 to be placed in the cache is compressed and stored in a non-faulted subportion of a physical way. The locations of faults in each of the physical ways 510 and 520 are provided by multi-bit parity maintained for each cache line, as previously described.

The faulted physical way 510 includes a non-faulted subportion 511 and a faulted subportion 512, where each subportion 511 and 512 represents half the capacity of the physical way. The presence of one or more persistent faults in only the faulted subportion 512 is indicated in the persistent fault history associated with the way 510. If the original data 501 is compressible at a compression ratio of at least 2:1 (corresponding to at least 50% space savings), then the non-faulted subportion 511 has sufficient capacity to store the compressed data 502.

In another faulted physical way 520, a faulted subportion 522 represents ¾ of the capacity of the physical way 520 (e.g., due to having more faults), while the non-faulted subportion represents ¼ of the capacity of the physical way 520. If the original data 501 is compressible at a ratio of at least 4:1 (corresponding to at least 75% space savings), then the non-faulted subportion 521 representing one quarter of the capacity of the physical way 520 has sufficient capacity to contain the compressed data 503. If the data 501 is compressible at a ratio of at least 4:1, the compressed copy of the data 503 is placed in the non-faulted subportion 521 instead of the non-faulted subportion 511, since the compressed data 503 occupies a larger fraction of the subportion 521 without exceeding its capacity. The non-faulted subportion 511 is thus reserved for less compressible data.

Figure 6:
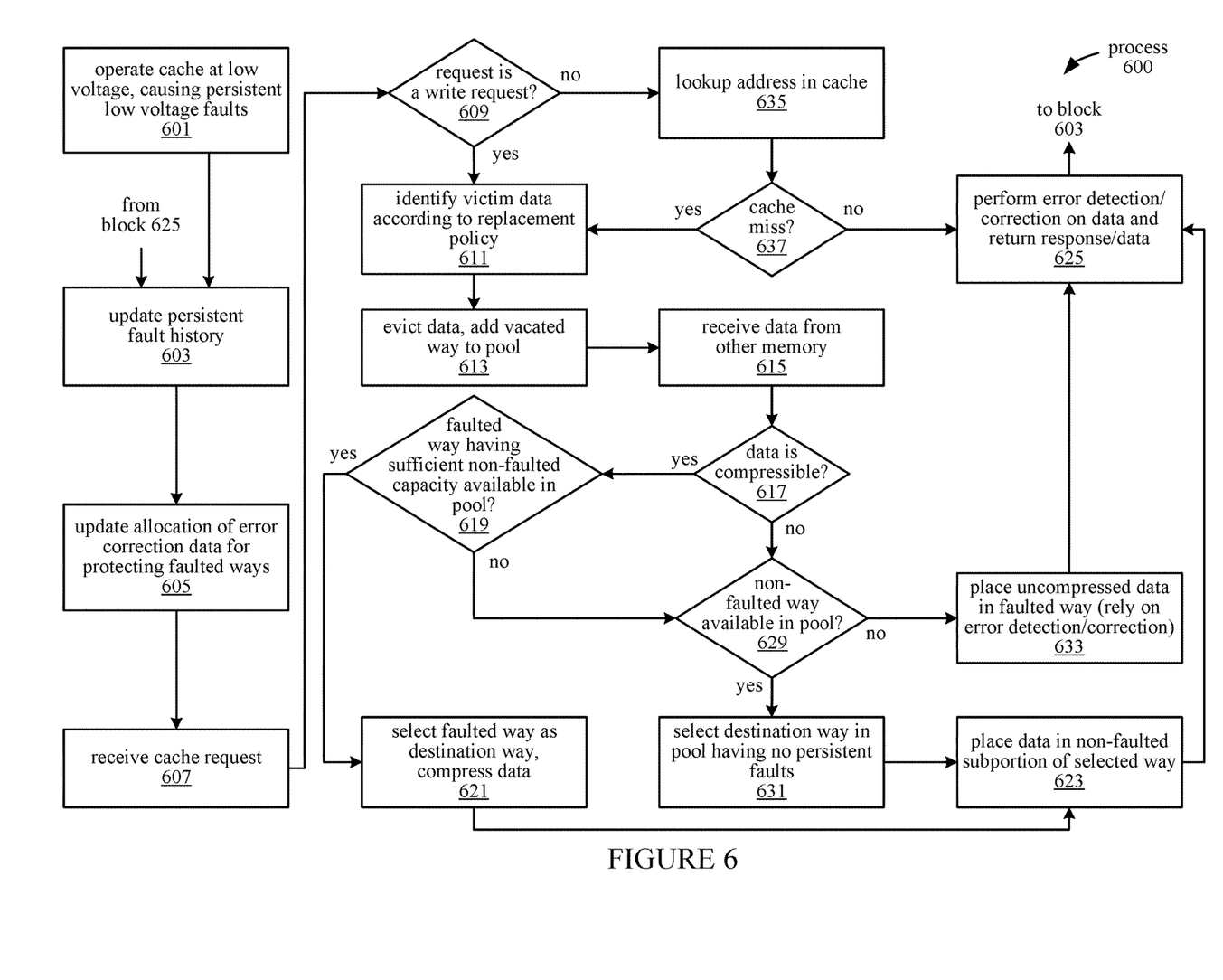
FIG. 6 is a flow diagram illustrating a process for operating a cache, according to an embodiment.

FIG. 6 presents a flow diagram illustrating a process 600 for operating a cache 300, according to an embodiment. The process 600 is performed by components in the computing device 100, particularly the components of the cache memory 300. The process 600 begins at block 601.

At block 601, the cache 300 is operated with a low supply voltage, causing persistent low voltage faults to occur in the data array 330. The low voltage is supplied by a power supply (e.g., power supply 220) connected to the cache. The low power supply voltage is lower than a nominal supply voltage, where the nominal supply voltage is a voltage at which the cache 300 can be operated without causing the persistent low voltage faults.

At block 603, the control logic 313 updates a persistent fault history, which indicates the presence and locations of the persistent faults in each of multiple portions (i.e., ways) of the data array 330. The control logic 313 updates the persistent fault history record for each portion in response to detecting one or more faults in the portion when accessing data in the cache 300.

At block 605, the control logic 313 updates an allocation of error correction data (e.g., error protection entries from ECC cache 341) for protecting data stored in each of the portions in which one or more persistent faults were detected, with the exception of portions in which faulted subportions are avoided by using data compression. In other words, ECC cache entries are allocated for portion of the data array 330 storing data using faulted bits.

At block 607, a request 316 is received at the cache controller 310. If the request 316 is a write request, the process 600 continues at block 611. At block 611, the replacement logic 311 identifies victim data to evict from the data array 330 according to a replacement policy. The replacement logic 311 accesses the replacement array 315 to identify the data (e.g., the LRU or LFU cache line) to evict according to the replacement policy. At block 613, the selected victim data is evicted from the cache, and the vacated way in the data array 330 is added to the replacement pool 314. In one embodiment, the replacement pool 314 includes a table or other data structure listing the vacated ways in the data array 330, and a value identifying the newly vacated way is added to the list. In alternative embodiments, a bit or value appended to a corresponding entry in the tag array 320, data array 330, replacement array 315, etc. indicates whether the way is in the replacement pool.

At block 615, the data to be written to the data array 330, as specified by the request 316, is received from other memory (e.g., a register, buffer, lower memory level, etc.). The compression engine 312 determines the compressibility of the data by calculating a maximum compression ratio for the data, a final size for the compressed copy of the data, the space savings from compressing the data, or some other compressibility metric. If the compressibility metric or a combination of the metrics exceeds a compressibility threshold, then the compression engine 312 determines that the data is compressible. In one embodiment, the compression engine 312 estimates an achievable compression ratio for the data and, if the estimated compression ratio is greater than 2:1, then the data is determined to be compressible. In one embodiment, the threshold is used to determine whether the data, when compressed, can be contained in a non-faulted subportion of a way, and is thus selected according to the size of the subportions. If the data is sufficiently compressible, the process 600 continues at block 619.

At block 619, the replacement logic 311 determines whether the replacement pool 314 contains a faulted way having sufficient non-faulted capacity for storing the data in its compressed form. In one embodiment, the replacement logic 311 identifies a suitable candidate way by determining that the candidate way has a persistent fault based on the fault history record for the candidate way, identifying a non-faulted subportion of the candidate way, then comparing the size of the non-faulted subportion to the size of the data in its compressed form. In one embodiment, any non-faulted subportion is assumed to be large enough to contain the compressed data (e.g., when all subportions are the same size and the compressibility threshold ensures that the compressed data will be less than the subportion size). At block 619, if at least one suitable candidate way is found in the replacement pool 314, the process 600 continues at block 621.

At block 621, the faulted candidate way is selected as the destination way for the incoming data specified in the request 316. The data is compressed and, at block 623, is stored in the non-faulted subportion of the destination way. With reference to FIG. 5, for example, the original incoming data 501 is compressed, and the resulting compressed copy 502 of the data is stored in the non-faulted subportion 511 of the selected destination way 510. The non-faulted subportion of the destination way is determined based on the locations of any persistent faults in the way, as indicated in the persistent fault history record. For a non-faulted subportion, the persistent fault history indicates an absence of any persistent faults (i.e., the existing faults in the way are excluded from the non-faulted subportion). From block 623, the process 600 continues at block 625. At block 625, the cache controller 310 returns a response 317 (e.g., for a write request, an indication that the write has been completed). From block 625, the process 600 returns to block 603.

At block 603, the persistent fault history record is updated, as appropriate. Following a write request, it is possible that no new faults were detected since the last execution of block 603. The fault history is also updated as appropriate to indicate whether compressed or uncompressed data is stored in the physical way and, if compressed data is stored in the way, in which subportion the compressed data is stored. At block 605, the allocation of error correction data is updated. If the prior request caused the replacement of non-compressible data (i.e., stored in a faulted subportion of the destination way) with new compressed data that avoids the faulted subportion of the destination way, then the changed way will no longer use additional error protection data, since the new compressed data is not susceptible to errors caused by the known persistent faults. The control logic 313 makes the error protection data available for reallocation to protect other data stored in a faulted subportion of a different physical way in the cache 300.

Referring back to block 619, if a suitable candidate way (i.e., having one or more persistent faults and a non-faulted subportion with sufficient capacity to contain the incoming compressed data) is not found in the replacement pool 314, then the process 600 continues at block 629. At block 629, if a non-faulted way (i.e., having no persistent faults indicated in its fault history record) is available in the replacement pool 314, then the non-faulted way is selected as the destination way, as provided at block 631. At block 623, the data is placed in the selected non-faulted destination way.

Since the incoming data is compressible, the data can be compressed by the compression engine 312 prior to storing a compressed copy of the data in the non-faulted destination way in order to reduce susceptibility of the data to soft errors (e.g., cosmic ray faults, etc.). Alternatively, the data is stored in uncompressed form to minimize the computational overhead associated with performing the compression and eventual decompression when the data is read.

At block 629, if the data is compressible, no faulted physical way has sufficient non-faulted capacity to store the data in compressed form (per block 619), and no non-faulted physical way is available in the replacement pool 314 (per block 629), then a faulted physical way that does not have sufficient non-faulted capacity is selected for storing the data. In this case, the compressible data can be stored in compressed or uncompressed form, and in either case, is stored using faulted (i.e., error-prone) bits of the cache line in the destination way. Since faulted bits are used to store data, additional error protection data is allocated for protecting the data. Following blocks 625 and 603, the error protection data is allocated at block 605 for protecting the data.

At block 605, when the error protection data is reallocated, the check-bits and/or other error protection data in the ECC cache 341 corresponding to the LRU physical way are evicted. The data in the LRU physical way itself is also evicted from the data array 330, as it is no longer protected from errors. Error protection data (e.g., ECC check-bits) for the new data is installed in the vacated entry in the ECC cache 341.

At block 617, if the incoming data is not compressible, the process 600 continues at block 629. If, at block 629, a non-faulted physical way is available in the replacement pool 314, then the non-faulted way is selected as the destination way at block 631, and the uncompressed data is placed in the non-faulted destination way at block 623.

At block 625, if the incoming data is not compressible and, at block 629, a non-faulted way is not available in the replacement pool 314, then the data is placed in uncompressed form in a faulted physical way selected from the replacement pool 314, as provided at block 633. Since faulty bits are used to store the data, error protection data is allocated from the ECC cache 341 to protect the data.

If the request 316 is a request to read data, then at block 609, the process 600 continues at block 635. At block 635, the memory address specified in the request 316 is used to identify a set for the data and determine whether the data is in the cache 300 by looking up a tag derived from the address in the identified set of the tag array 320. At block 637, if the matching tag is not present in the identified set of the tag array 320, then a cache miss occurs, and the process 600 continues at block 611. From block 611, the process 600 continues as previously described to retrieve the requested data using the specified memory address from a lower level of memory, determine if the memory is compressible, and store the memory in an appropriate faulted or non-faulted physical way depending on the compressibility of the data and the availability of the faulted or non-faulted physical way in the replacement pool 314. At block 625, the data is returned to fulfill the read request 316.

At block 637, if a cache miss does not occur (i.e., a matching tag is located for the requested address in the tag array 320), then at block 625, the requested data is retrieved from the cache line stored in the physical way corresponding to the matching tag. Error detection is performed on the data, in which the locations of any faults in the data are determined using multi-bit segmented parity. If errors are detected, they are corrected using error protection data from the ECC cache 341, by referencing the same data in lower memory, etc. The locations of the detected faults are recorded in the persistent fault history at block 603.

Operation of the cache 300 according to process 600 allows the cache 300 to be operated using a lower power supply voltage while reducing the effects of persistent low voltage faults. Selective compression of data increases utilization of faulted physical ways in the cache 300, thus reducing cache misses that would otherwise result from a lower effective cache capacity when operating under low voltage supply conditions. In addition, the mechanism for allocating error protection data in the foregoing embodiments maintains a failure probability for low voltage operation that is comparable to an SRAM-based cache operating with a safe nominal power supply voltage.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing device 100 and/or portions thereof carried on the computer-readable storage medium may be a database or other data structure which can be read by a program and used, directly or indirectly, to fabricate the hardware including the computing device 100. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates which also represent the functionality of the hardware including the computing device 100. The netlist may then be placed and routed to produce a data set describing geometric shapes to be applied to masks. The masks may then be used in various semiconductor fabrication steps to produce a semiconductor circuit or circuits corresponding to the computing device 100. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader scope of the embodiments as set forth in the appended claims. The specification and drawings are, accordingly, to be regarded in an illustrative sense rather than a restrictive sense.

What is claimed is:

1. A method of operating a cache in a computing device, comprising:
    in response to receiving a memory access request at the cache, determining compressibility of data specified by the request;
    selecting in the cache a destination portion for storing the data based on the compressibility of the data and a persistent fault history of the destination portion;
    storing a compressed copy of the data in a non-faulted subportion of the destination portion, wherein the persistent fault history indicates that the non-faulted subportion excludes any persistent faults; and
    prior to receiving the memory access request, allocating error protection data for protecting prior data stored in the destination portion; and
    in response to storing the compressed copy of the data in the non-faulted subportion of the destination portion, reallocating the error protection data for protecting other data in a different portion of the cache having one or more persistent faults.

2. The method of claim 1, further comprising:
    causing one or more persistent faults in the destination portion by supplying a low supply voltage to the cache, wherein:
        the persistent fault history indicates a presence of the one or more persistent faults in the destination portion, and
        the low supply voltage is lower than a nominal supply voltage for operating the cache without the persistent low voltage faults.

3. The method of claim 1, further comprising:
    prior to receiving the memory access request, updating the persistent fault history of the destination portion in response to detecting one or more persistent faults in the destination portion; and
    identifying the non-faulted subportion of the destination portion based on a location of one or more persistent faults indicated in the persistent fault history.

4. The method of claim 1, wherein:
    determining the compressibility of the data comprises determining a size of the compressed copy of the data; and
    selecting of the destination portion is based on comparing the non-faulted subportion with the size of the compressed copy of the data.

5. The method of claim 1, wherein:
    determining the compressibility of the data further comprises determining a maximum compression ratio for the data;
    the destination portion is selected in response to determining that the maximum compression ratio exceeds a threshold compression ratio; and
    the persistent fault history indicates an absence of persistent faults in the non-faulted subportion.

6. The method of claim 1, further comprising, prior to receiving the memory access request:
    in response to a cache miss, identifying victim data based on a replacement policy;
    vacating the destination portion of the cache by evicting the victim data from the destination portion; and
    adding the destination portion to a replacement pool of available portions, wherein the destination portion is selected based on determining that the destination portion is in the replacement pool.

7. The method of claim 6, further comprising:
    compressing the data in response to determining that the replacement pool contains at least one available portion having a persistent fault.

8. The method of claim 1, wherein the persistent fault history indicates an absence of persistent faults in the destination portion.

9. A cache device, comprising:
    an input configured to receive a memory access request;
    replacement logic circuitry coupled with the input and a data array of the cache, wherein the replacement logic circuitry is configured to:
        in response to receiving the memory access request at the input, determine compressibility of data specified by the request,
        select in the data array a destination portion for storing the data based on the compressibility of the data and a persistent fault history of the destination portion, and store a compressed copy of the data in a non-faulted subportion of the destination portion, wherein the persistent fault history indicates that the non-faulted subportion excludes any persistent faults;

a compression engine circuit coupled with the replacement logic circuitry and configured to generate the compressed copy of the data; and control logic circuitry configured to:
  prior to the receiving of the memory access request, allocate error protection data for protecting prior data stored in the destination portion, and
  in response to storing the compressed copy of the data in the non-faulted subportion of the destination portion, reallocating the error protection data for protecting other data in a different portion of the cache having one or more persistent faults.

10. The cache device of claim 9, further comprising:
control logic circuitry configured to, prior to receiving the memory access request, update the persistent fault history of the destination portion in response to detecting one or more persistent faults in the destination portion, wherein the replacement logic circuitry is further configured to identify the non-faulted subportion of the destination portion based on a location of one or more persistent faults indicated in the persistent fault history.

11. The cache device of claim 9, wherein:
the compression engine circuit is further configured to determine the compressibility of the data by calculating a size of the compressed copy of the data; and
the replacement logic circuitry is further configured to select the destination portion based on comparing the non-faulted subportion with the calculated size of the compressed copy of the data.

12. The cache device of claim 9, wherein:
the compression engine circuit is further configured to determine the compressibility of the data by determining a maximum compression ratio for the data;
the replacement logic circuitry is configured to select the destination portion in response to determining that the maximum compression ratio exceeds a threshold compression ratio; and
the persistent fault history indicates an absence of any persistent faults in the non-faulted subportion.

13. The cache device of claim 9, wherein:
the replacement logic circuitry is further configured to, prior to receiving the memory access request:
  in response to a cache miss, identify victim data based on a replacement policy,
  vacate the destination portion of the cache by evicting the victim data, and
  add the destination portion to a replacement pool of available portions; and
the destination portion is selected based on determining that destination portion is in the replacement pool.

14. The cache device of claim 9, wherein the persistent fault history indicates an absence of persistent faults in the destination portion.

15. A computing device, comprising:
one or more processing cores; and
a set of one or more cache devices, wherein each cache device in the set of one or more cache devices is coupled with a processing core of the one or more processing cores and is configured to:
  in response to receiving a memory access request from the processing core, determine compressibility of data specified by the request;
  select in the cache device a destination portion for storing the data based on the compressibility of the data and a persistent fault history of the destination portion;
  store a compressed copy of the data in a non-faulted subportion of the destination portion, wherein the persistent fault history indicates that the non-faulted subportion excludes any persistent faults;
  prior to the receiving of the memory access request, allocate error protection data for protecting prior data stored in the destination portion; and
  in response to storing the compressed copy of the data in the non-faulted subportion of the destination portion, reallocating the error protection data for protecting other data in a different portion of the cache having one or more persistent faults.

16. The computing device of claim 15, further comprising:
a power supply configured to select either of a nominal supply voltage or a low supply voltage for supplying to the set of one or more cache devices, wherein:
  supplying the low supply voltage to the cache causes one or more persistent faults in the destination portion,
  the persistent fault history indicates a presence of the one or more persistent faults in the destination portion, and
  the low supply voltage is lower than the nominal supply voltage.

17. The computing device of claim 15, wherein each cache device in the set of one or more cache devices is further configured to, prior to receiving the memory access request:
  in response to a cache miss, identify victim data based on a replacement policy;
  vacate the destination portion of the cache by evicting the victim data; and
  add the destination portion to a replacement pool of available portions, wherein the destination portion is selected based on determining that destination portion is in the replacement pool.

18. The computing device of claim 15, wherein the set of one or more cache devices comprises a level 2 (L2) cache and a level 3 (L3) cache in the same cache hierarchy.

* * * * *